US012684357B1

(12) United States Patent
DeRego et al.

(10) Patent No.: US 12,684,357 B1
(45) Date of Patent: Jul. 14, 2026

(54) CUSTOMER-SPECIFIED GRANULAR SECURITY RULES FOR RADIO-BASED APPLICATIONS IMPLEMENTED USING CLOUD RESOURCES

(71) Applicant: Amazon Technologies, Inc., Seattle, WA (US)

(72) Inventors: Theodore Joseph Maka'iwi DeRego, Shoreline, WA (US); Oleksii Tsai, Kenmore, WA (US); Nikolay Krasilnikov, Seattle, WA (US); Aditya Vikram, San Ramon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 18/467,963

(22) Filed: Sep. 15, 2023

(51) Int. Cl.
| | |
|---|---|
| *H04W 12/37* | (2021.01) |
| *H04W 12/033* | (2021.01) |
| *H04W 12/088* | (2021.01) |

(52) U.S. Cl.
CPC ......... *H04W 12/37* (2021.01); *H04W 12/033* (2021.01); *H04W 12/088* (2021.01)

(58) Field of Classification Search
CPC .. H04W 12/37; H04W 12/033; H04W 12/088
See application file for complete search history.

(56) References Cited

U.S. PATENT DOCUMENTS

| | | | |
|---|---|---|---|
| 8,539,079 | B2 | 9/2013 | Thireault |
| 9,092,269 | B2 | 7/2015 | Kandula |

| | | | |
|---|---|---|---|
| 9,125,047 | B2 | 9/2015 | Sundaresan et al. |
| 9,529,620 | B1 | 12/2016 | Dow |
| 9,703,660 | B2 | 7/2017 | Cillis et al. |
| 9,838,268 | B1 | 12/2017 | Mattson |
| 9,876,851 | B2 | 1/2018 | Chandramouli et al. |
| 10,064,242 | B2 | 8/2018 | Pawar et al. |
| 10,135,702 | B2 | 11/2018 | Lahiri |
| 10,244,507 | B2 | 3/2019 | Tarlazzi et al. |
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 | 3/2020 | Park et al. |

(Continued)

FOREIGN PATENT DOCUMENTS

| | | | | |
|---|---|---|---|---|
| EP | 1689206 A1 * | 8/2006 | ............. | H04L 63/02 |
| WO | WO-2013122597 A1 * | 8/2013 | .......... | G06F 9/5005 |
| WO | 2014073949 | 5/2014 | | |

OTHER PUBLICATIONS

Loannidis et al, Implementing a Distributed Firewall, Nov. 2000, ACM conference on computer and communication security, pp. 1-11. (Year: 2000).*

(Continued)

*Primary Examiner* — Abu S Sholeman

(74) *Attorney, Agent, or Firm* — Robert C. Kowert; Kowert, Hood, Munyon, Rankin & Goetzel, P.C.

(57) ABSTRACT

A set of security rules for user plane traffic of a subset of user equipment (UE) devices of a radio-based application is received via programmatic interfaces at a service of a cloud provider network. A packet comprising user data associated with a UE device of the subset is received at a network function implementation server of the service. An action indicated in a security rule is implemented with respect to the packet at the server.

20 Claims, 10 Drawing Sheets

(56)                References Cited

U.S. PATENT DOCUMENTS

| | | | |
|---|---|---|---|
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,891,140 | B1 | 1/2021 | Levin |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,159,344 | B1 | 10/2021 | Shevade et al. |
| 11,190,413 | B1 | 11/2021 | Priya et al. |
| 11,252,655 | B1* | 2/2022 | Gupta .................... H04L 67/02 |
| 11,283,708 | B1 | 3/2022 | Troup |
| 11,336,721 | B2 | 5/2022 | Parulkar et al. |
| 11,356,500 | B1* | 6/2022 | Gupta ................ H04L 67/1001 |
| 11,539,582 | B1 | 12/2022 | Gupta et al. |
| 11,552,842 | B2 | 1/2023 | Barabell |
| 11,606,691 | B1* | 3/2023 | Verma .................. H04W 12/033 |
| 11,720,425 | B1 | 8/2023 | Yang et al. |
| 11,743,117 | B2 | 8/2023 | Gupta et al. |
| 11,800,404 | B1 | 10/2023 | Yang |
| 11,824,943 | B1 | 11/2023 | Krasilnikov et al. |
| 11,916,999 | B1 | 2/2024 | Gupta |
| 11,937,103 | B1 | 3/2024 | Krasilnikov |
| 11,985,065 | B2 | 5/2024 | Shevade et al. |
| 12,075,254 | B1* | 8/2024 | Gupta .................. H04W 12/37 |
| 12,408,036 | B1* | 9/2025 | Khan ........................ G06F 8/61 |
| 2004/0213172 | A1* | 10/2004 | Myers ................ H04W 12/122 |
| | | | 370/313 |
| 2009/0111387 | A1* | 4/2009 | Obuchi ............ H04W 52/0216 |
| | | | 455/68 |
| 2009/0209291 | A1* | 8/2009 | Ramprasad ......... H04L 63/0263 |
| | | | 455/564 |
| 2012/0064908 | A1* | 3/2012 | Fox ....................... H04W 28/10 |
| | | | 455/452.2 |
| 2012/0127151 | A1 | 5/2012 | Murakami |
| 2013/0044705 | A1* | 2/2013 | Akhtar ................ H04L 12/5692 |
| | | | 370/328 |
| 2013/0343399 | A1 | 12/2013 | Kandula |
| 2014/0189686 | A1 | 7/2014 | Masters |
| 2014/0351811 | A1 | 11/2014 | Kruglick |
| 2016/0165481 | A1* | 6/2016 | Jin .................... H04W 28/0263 |
| | | | 370/236 |
| 2016/0344611 | A1 | 11/2016 | Más Ivars et al. |
| 2017/0118102 | A1 | 4/2017 | Majumder |
| 2017/0331680 | A1 | 11/2017 | Ji et al. |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1 | 6/2019 | Power et al. |
| 2019/0213029 | A1 | 7/2019 | Liu et al. |
| 2019/0215904 | A1* | 7/2019 | Wu ..................... H04W 12/069 |
| 2019/0289497 | A1 | 9/2019 | Rajagopal |
| 2019/0342161 | A1 | 11/2019 | Brandwine |
| 2019/0391855 | A1 | 12/2019 | Bernat et al. |
| 2019/0394826 | A1 | 12/2019 | Wang et al. |
| 2020/0084110 | A1 | 3/2020 | Kim et al. |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0089239 | A1 | 3/2021 | Liguori et al. |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2022/0021605 | A1 | 1/2022 | Bagwell |
| 2022/0030117 | A1 | 1/2022 | Young et al. |
| 2022/0046084 | A1 | 2/2022 | Nair |
| 2022/0070734 | A1 | 3/2022 | Rajagopal |
| 2022/0345361 | A1 | 10/2022 | Yang et al. |
| 2022/0377615 | A1 | 11/2022 | Radunovic |
| 2022/0405114 | A1 | 12/2022 | Chen |
| 2023/0054537 | A1 | 2/2023 | De Vito et al. |
| 2023/0179974 | A1* | 6/2023 | Gadalin .................. H04W 4/50 |
| | | | 455/418 |
| 2023/0180017 | A1* | 6/2023 | Gadalin ............... H04W 16/22 |
| | | | 370/328 |
| 2023/0315534 | A1 | 10/2023 | Asawa |
| 2023/0325266 | A1 | 10/2023 | Yang |
| 2023/0409362 | A1 | 12/2023 | Shevade |
| 2023/0409363 | A1 | 12/2023 | Shevade |
| 2023/0421595 | A1* | 12/2023 | Mitani ................ H04L 63/1433 |
| 2024/0040002 | A1 | 2/2024 | Krasilnikov et al. |
| 2024/0187977 | A1* | 6/2024 | Chong .................. H04W 76/11 |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |

OTHER PUBLICATIONS

U.S. Appl. No. 17/364,779, filed Jun. 30, 2021, Diwakar Gupta.
U.S. Appl. No. 17/364,788, filed Jun. 30, 2021, Diwakar Gupta.
U.S. Appl. No. 18/630,891, filed Apr. 9, 2024, Shevade, et al.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/810,319, filed Jun. 30, 2022, Julius Mueller, at al.
U.S. Appl. No. 17/808,518, filed Jun. 23, 2022, Ozgur Dural.
U.S. Appl. No. 17/548,391, filed Dec. 10, 2021, Ammar Latif.
Unknown, "5G; NG-RAN; Architecture Description", Technical Specification, ETSI TS 138 401, Version 16.8.0, Release 16, Jan. 2022, pp. 1-82.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].
U.S. Appl. No. 18/334,310, filed Jun. 13, 2023, Ximeng Simon Yang, et al.
U.S. Appl. No. 17/326,221, filed May 20, 2021, Ximeng Simon Yang, et al.
U.S. Appl. No. 17/710,571, filed Mar. 31, 2022, Manjari Asawa, et al.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 18/066,943, filed Dec. 15, 2022, Awaiz Ahmad Khan et al.
Unknown, "LTE; 5G; Interface between the Control Plane and the User Plane nodes", Technical Specification, ETSI TS 129 244, Version 16.5.0, Nov. 2020, pp. 1-317.

* cited by examiner

Figure 3:
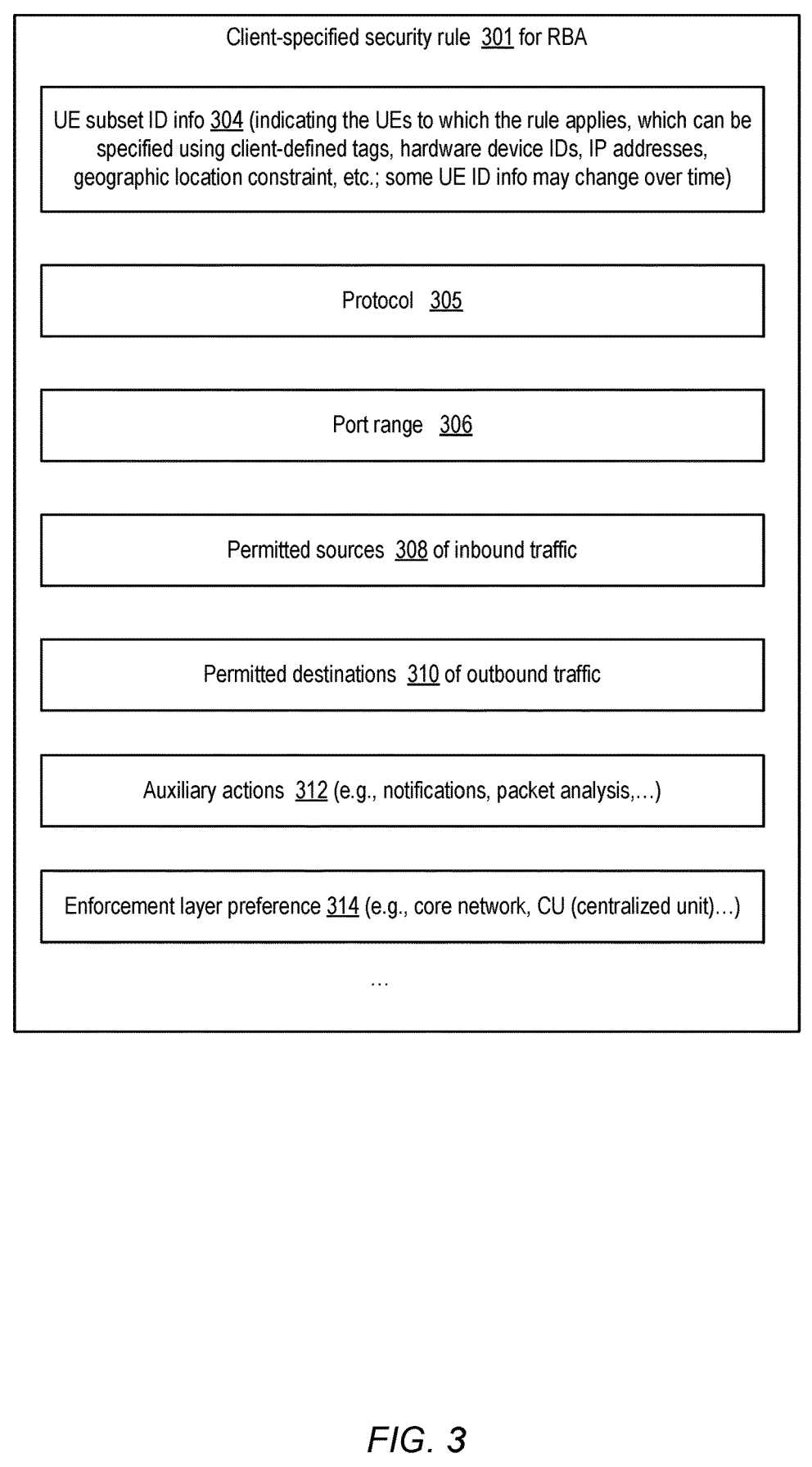

Client-specified security rule  301 for RBA

UE subset ID info 304 (indicating the UEs to which the rule applies, which can be specified using client-defined tags, hardware device IDs, IP addresses, geographic location constraint, etc.; some UE ID info may change over time)

Protocol  305

Port range  306

Permitted sources  308 of inbound traffic

Permitted destinations  310 of outbound traffic

Auxiliary actions  312 (e.g., notifications, packet analysis,...)

Enforcement layer preference 314 (e.g., core network, CU (centralized unit)...)

Programmatic interfaces 877

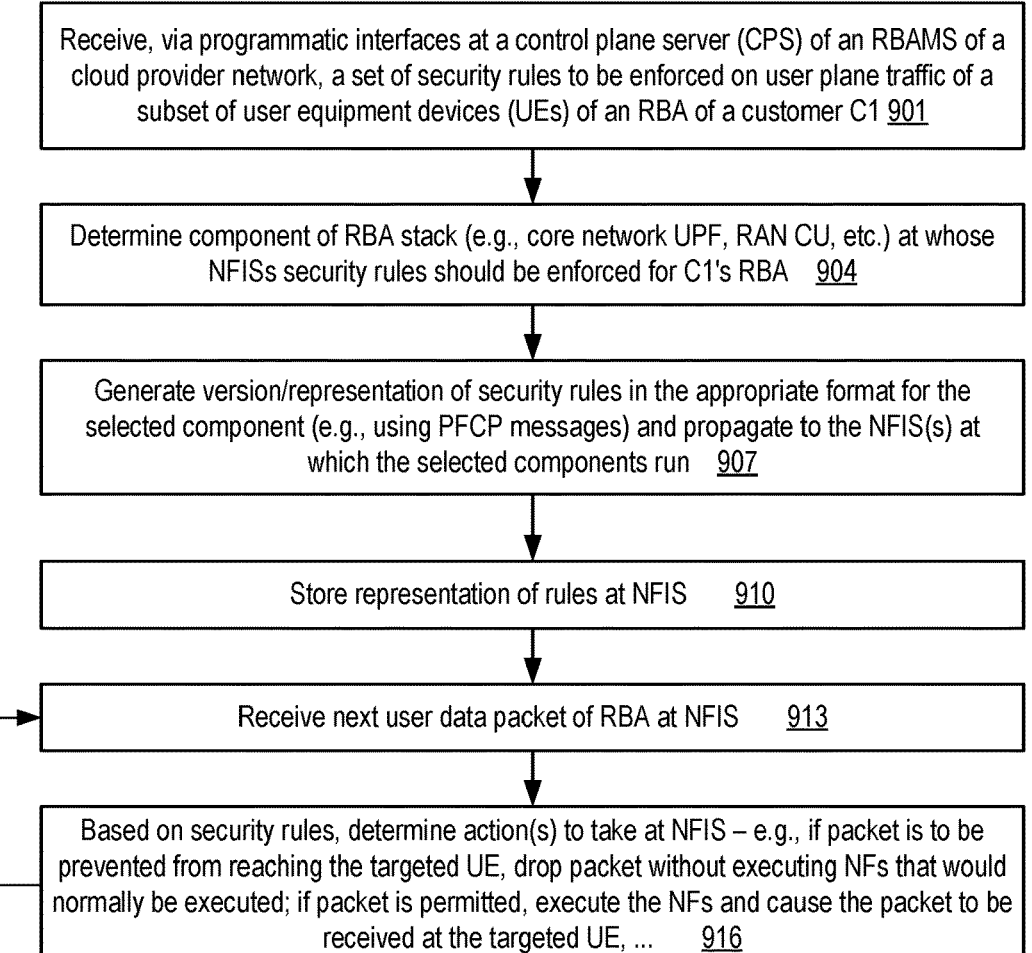

Receive, via programmatic interfaces at a control plane server (CPS) of an RBAMS of a cloud provider network, a set of security rules to be enforced on user plane traffic of a subset of user equipment devices (UEs) of an RBA of a customer C1 901

Determine component of RBA stack (e.g., core network UPF, RAN CU, etc.) at whose NFISs security rules should be enforced for C1's RBA 904

Generate version/representation of security rules in the appropriate format for the selected component (e.g., using PFCP messages) and propagate to the NFIS(s) at which the selected components run 907

Store representation of rules at NFIS 910

Receive next user data packet of RBA at NFIS 913

Based on security rules, determine action(s) to take at NFIS – e.g., if packet is to be prevented from reaching the targeted UE, drop packet without executing NFs that would normally be executed; if packet is permitted, execute the NFs and cause the packet to be received at the targeted UE, ... 916

*FIG. 9*

CUSTOMER-SPECIFIED GRANULAR SECURITY RULES FOR RADIO-BASED APPLICATIONS IMPLEMENTED USING CLOUD RESOURCES

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

BRIEF DESCRIPTION OF DRAWINGS

FIG. 3 illustrates example elements of a client-specified security rule for a subset of UEs of a radio-based application, according to at least some embodiments.

FIG. 9 is a flow diagram illustrating aspects of operations which may be performed to enforce client-specified security rules for UEs of radio-based applications implemented with the help of a provider network service, according to at least some embodiments.

Figure 1:
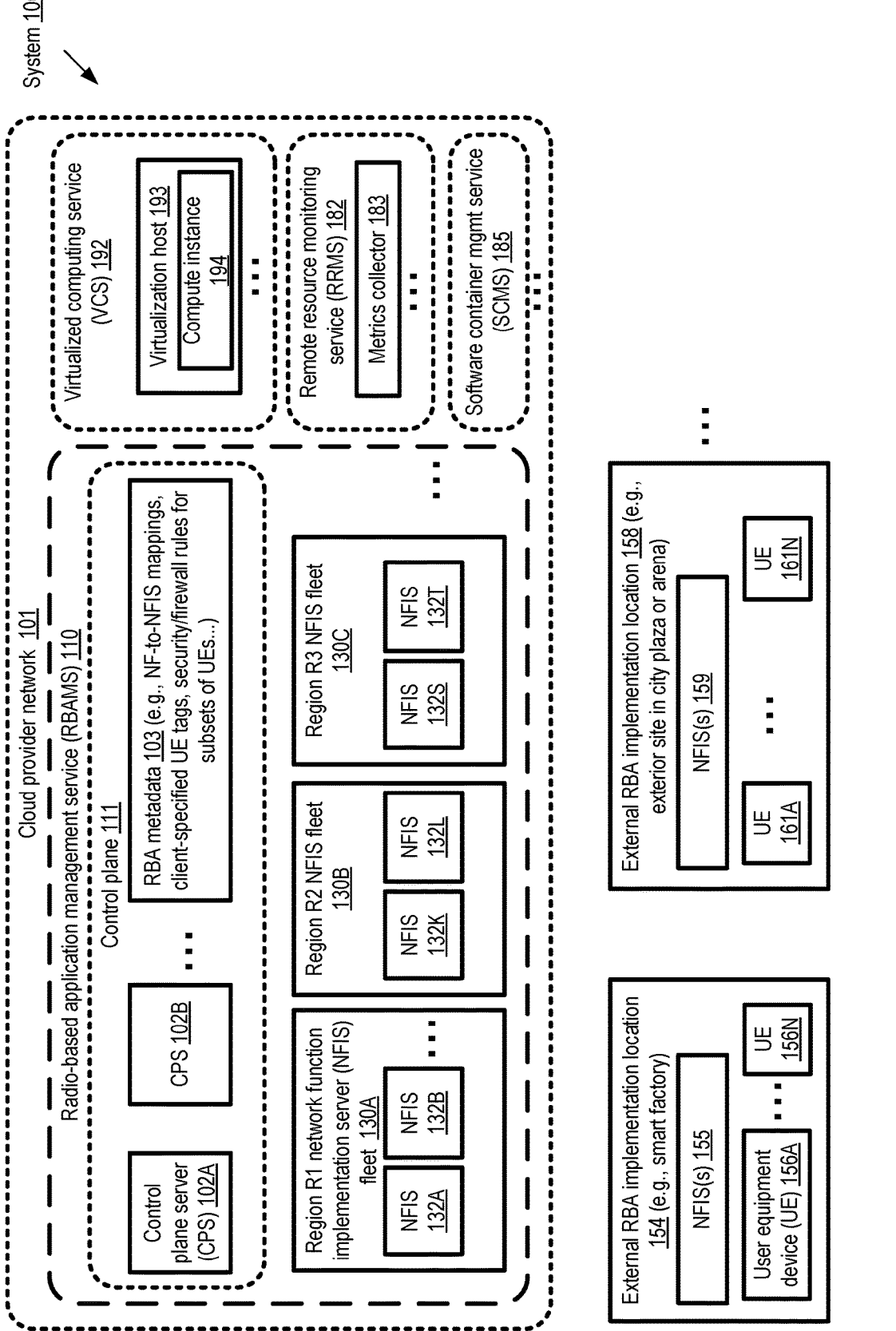
FIG. 1 illustrates an example system environment in which a service of a cloud provider network may enforce client-specified granular security rules for traffic of selected subsets of user equipment devices (UEs) of radio-based applications implemented using the service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enforcement of granular security rules, similar to firewalls, specified for respective groups of end user equipment devices (UEs) by customers of radio-based applications (such as 5G or fifth generation mobile private networks (MPNs)) which are implemented at least partly using cloud provider network resources. The security rules can, for example, restrict the sources from which data packets of a particular networking protocol can be accepted at a UE such as a radio-equipped robot in a smart factory at which a portion of an MPN is set up, and/or the destinations to which data packets can be sent from such a UE. Respective subsets of UEs of a given radio-based application can in general have differing security requirements—e.g., some UEs of an MPN may comprise web servers to which requests are to be permitted from specified sources outside the MPN, inbound or outbound communication of other UEs may be restricted to devices within the MPN, and so on. The techniques introduced herein can enable UE owners or application administrators to easily specify rules for enforcing such requirements, obtain metrics associated with the rules (such as how often attempts to send packets from restricted sources were made), modify the set of UEs to which a given rule is to apply, and so on. The rules can be specified via user-friendly programmatic interfaces of a network-accessible service of the cloud provider network, and the rules can be enforced efficiently at centralized components of the radio-based application (such as servers implementing 5G core network functions) that are run using the network-accessible service.

MPNs represent one example of the types of radio-based applications at which such customer-supplied security rules can be enforced. MPNs are dedicated business networks, typically set up and used on behalf of a particular organization or entity, that use licensed, shared, or unlicensed wireless spectrum and cellular infrastructure to transmit voice and data to and from UEs such as smart phones, Internet-of-Things (IoT) devices, embedded modules, and the like. MPNs are referred to as "non-public networks" by 3GPP (3rd Generation Partnership Project), a mobile telecommunications standards organization. The term "radio-based application" (RBA) is used herein to refer to applications (including but not limited to MPNs) in which at least some messages are transmitted using radio frequency signals and associated antennas, such as those used for various generations (4G, 5G and the like) of cellular broadband technologies. An MPN can also be referred to as a private cellular network.

A radio-based application management service (RBAMS) of a cloud computing environment can be used to implement at least some portions of the functionality of RBAs such as MPNs. The RBAMS can include network function implementation servers (NFISs) at which network functions of various layers of radio-based technology stacks can be executed, as well as control plane servers (CPSs) responsible for administrative tasks such as provisioning and configuring the NFISs. The CPSs can implement programmatic interfaces, such as web-based consoles, graphical user interfaces, command-line tools, application programming interfaces (APIs) and the like which can be used by RBAMS customers to set up RBAs, specify security rules for UE groups or individual UEs, and so on. After a customer specifies a security rule for a subset of UEs of a given RBA via such programmatic interfaces, the CPSs of the RBAMS can cause representations of the rules to be propagated to the NFISs at which the rules are to be enforced. Subsequently, as and when user data packets of the RBA are received at the NFISs to which the rules have been propagated, the rules may be enforced on those user data packets—e.g., some packets may be dropped, while others may be allowed to proceed towards their destinations. Other kinds of security-related actions specified by the customers in the rules can also be performed, such as generating notifications indicating unexpected patterns of traffic, inspection of contents of a subset of user data packets, and so on. The RBAMS can automatically take care of the scalability and high availability of the NFISs, as well as administrative actions such as software updates of the NFISs, so that the security rules continue to be enforced as the workload level of the RBA changes.

As one skilled in the art will appreciate in light of this disclosure, certain embodiments may be capable of achieving various advantages, including some or all of the following: (a) enabling customized security rules at any desired granularity to be specified and enforced for UE devices utilizing radio-based applications, thereby improving the overall security posture of the applications, and/or (b) improving the user experience of administrators of radio-based applications by enabling management of application security using industry-standard provider network tools, interfaces, and computing resources such as network function implementation servers. Security of user data flowing to/from a wide variety of UEs can be controlled easily using the kind of techniques introduced herein, including but not limited to phones, robots, sensors, Internet-of-Things devices such as smart appliances, and so on.

According to some embodiments, a system may include a set of control plane servers (CPSs) of an RBAMS implemented at least in part at a cloud provider network, and a set of network function implementation servers (NFISs) of the RBAMS. A network function is a functional building block within a network infrastructure, which has well-defined external interfaces and a well-defined functional behavior. Network functions can be chained together in pipelines to form various kinds of RBAs. Network functions have historically been implemented as a physical network appliance or node; however network functions can be virtualized as well. The NFISs may, for example, be used to execute virtualized network functions. Based on functional, performance and location-related requirements of an RBA of a client of the RBAMS, indicated to the CPSs via programmatic interfaces, the CPSs may configure or set up various NFISs to execute network functions at one or more layers of a radio-based technology stack in various embodiments. For example, one or more NFISs located at data centers of the provider network or at edge locations may be configured by the CPSs to implement core network functions such as UPFs (User Plane Functions) for the RBA, other NFISs located at or near customer premises may be configured to execute RAN (Radio Access Network) node network functions, and so on.

In addition to the functional, performance and location-related requirements, security requirements may also be specified by the client programmatically in at least some embodiments. For example, a CPS may receive a set of security rules such as firewall rules to be enforced on user plane traffic of a subset of user equipment (UE) devices of a specified RBA of a client. In some embodiments, the RBA may have been established on behalf of an organization which is a client of the cloud provider network, and an administrator of the RBA (e.g., an authorized employee of the organization on whose behalf the RBA was set up) may use programmatic interfaces implemented by the CPSs to provide the security rules. In other embodiments, one or more individuals that own or control specific UEs (such as an owner of a cell phone) and have been authorized by the RBA administrator may submit security rules for their UEs using the programmatic interfaces. The CPS may identify the appropriate set of NFISs at which the rules should be applied, and cause a representation of the rules specified by the client to be propagated to that set of NFISs for execution. A number of different approaches may be used to select the particular NFISs to which the rules should be sent in different embodiments—e.g., preferences indicated by the client with regard to the layer of the radio-based technology stack or the physical locations at which the rules should be implemented may be taken into account by the CPSs, or default policies of the RBAMS regarding security rule implementation NFIS selection may be used. The manner and format in which the rules are propagated to the NFIS(s) may also differ from one embodiment to another. For example, in some embodiments in which the rules are to be implemented at NFISs that execute UPFs, a rule may be sent to the UPF-implementing NFIS using a message formatted in accordance with PFCP (Packet Forwarding Control Protocol). As such, the CPS may be responsible for in effect translating the security rule into one or more PFCP messages in such embodiments. Other protocols and/or formats may be used to convey the rules to the appropriate NFISs in various embodiments.

Having received the rules, the NFISs may start implementing or enforcing the rules in various embodiments, e.g., in addition to executing the other network functions for which the NFISs were set up. In general, independent of security rule implementation, a given NFIS may be responsible for executing one or more network functions of the RBA, which may be referred to as the based workload of the NFIS; the enforcement of applicable security rules may thus be considered additional work beyond the base set of network functions for which the NFIS is responsible. The enforcement of client-specified security rules may in effect be considered an additional or auxiliary network function of the NFIS in various embodiments.

As indicated above, a given security rule set may be specified for a particular subset of UE devices (e.g., a single UE device, or a group of UE devices) by the RBAMS client. In response to receiving a packet of the RBA, comprising user data directed to a UE device of the subset to which a set of security rules applies, the NFIS (e.g., one or more security rule enforcement programs running at the NFIS) may determine whether transmission of the packet is prohibited by the rules in various embodiments. To make the determination as to whether the transmission of the packet to the UE is prohibited, in some embodiments the NFIS may examine one or more properties of the packet (such as the network port to which it is directed, the networking protocol being used for the packet, etc.) and compare those properties to the definitions of the rules of the rule set. In response to determining that the set of security rules (if any) specified for that UE device does not prohibit transmission of the packet to the UE device, the NFIS may execute a particular network function of the RBA (such as a function of the core network layer, a network function of a RAN node, etc., which is part of the base workload of the RBA) with respect to the packet, and cause the packet to be transmitted along a path to the UE device. Note that this path may include one or more intermediaries in some cases—e.g., if the security rules are being enforced at an NFIS implementing core network functions, the path may include other NFISs implementing RAN node functions, and so on. In contrast, if the NFIS determines that the set of security rules prohibits transmission of a received user data packet to the UE device, the NFIS may drop that user data packet without executing the base workload network function with respect to it in at least some embodiments. In various embodiments, these types of security rules may be specified and executed for traffic in either direction (traffic directed towards a specified subset of UEs and/or traffic originating at a specified subset of UEs) with respect to the UEs of the RBA.

In addition to or instead of the action of dropping packets with specified characteristics, in some embodiments, a client-specified security rule may indicate other types of actions that are to be performed by the RBAMS for packets with the specified characteristics. For example, in one embodiment, a security rule may indicate that contents of a user data packet which satisfies a set of criteria indicated in the rule are to be analyzed or examined (e.g., to try to determine whether the packet is part of a security attack, and if so, to try to identify the source or other properties of the attack or the attackers). In another embodiment, a security rule may indicate that a notification is to be generated and sent to a specified destination or destinations (such as the email address of an administrator of the RBA) if a packet with characteristics specified in the rule is received. As such, any combination of various types of actions may be implemented based on the customer-defined security rules in different embodiments.

Any of a number of different approaches may be taken for specifying the target set of UEs for which a security rule is to be applied. In some RBAs, some UE devices may be assigned at least one Internet Protocol (IP) address, such as an IP version 6 address or an IP version 4 address, and such addresses may be used by the RBA client to specify the set of UEs to which a given rule applies. In one embodiment, the RBAMS may support assignment of client-specified tags to UE devices—e.g., a hundred radio-equipped robots in a smart factory may all be assigned the tag "SmartRobot" by an administrator of the smart factory via programmatic interfaces of the RBAMS. In such a scenario, the set of UEs to which a security rule is to be applied may be indicated by specifying such tags—for example, a rule to be applied to all hundred robots may include a clause similar to "tag='SmartRobot'" to specify applicability to the robots. In other embodiments, individual ones of the UEs may have respective hardware device identifiers and/or SIM (subscriber identification module) cards which can be used to specify applicability of client-defined security rules. In some embodiments, the set of UEs to which a given rule is to be applied may be indicated by providing a geographical or physical location (or vicinity to a specified location)—e.g., the client may request that a particular rule is to be applied to UEs that are located within a particular distance from a cell tower or a named building or room within a building. When propagating the representation of the rule to an NFIS, a CPS may take such location information into account, e.g., when selecting the NFISs to which the rule should be sent, and/or when translating the rule into a format understood by the NFISs. Note that in some cases, the identification information (such as an IP address) of a UE may change over time. In some embodiments, the CPSs may send updates to the NFISs as and when such changes occur, so that the NFISs are able to keep applying the security rules to the correct set of UEs.

A given client-specified security rule may indicate any of a number of characteristics of the user data packets for which security-related actions are to be taken in different embodiments. Such characteristics may include source or destination network ports, networking protocols (such as HyperText Transfer Protocol or HTTP) to whose packets the rules are to be applied, the sizes of the packets (e.g., some rules may be applied to packets above a threshold size or below a threshold size), and so on.

Any of a number of techniques may be used by a CPS to translate a client-specified security rule into a format which can be parsed and processed by an NFIS. In one embodiment, for example, the CPS may generate one or more PFCP messages indicating the logic and/or applicability of a rule set specified by a client, and send the PFCP message(s) to the NFIS.

Security rules of the kind indicated above may be defined for numerous types of UE devices in different embodiments. The UE devices to which a given rule applies may, for example, comprise cellular phones, IoT devices such as sensors, robots and the like, portable computer systems, augmented reality/virtual reality (AR/VR) devices, voice-activated personal assistant devices, and the like. In one embodiment, a given UE device for which a client-specified security rule is enforced may comprise an access point of another customer network which contains its own group of connected devices. Such an access point, similar in concept to a Wi-Fi router or hotspot device, may distribute packets received from one or more sources (such as packets received from NFISs of the RBA) among the connected devices of the customer network, and/or transmit packets originating at the connected devices to one or more destinations outside the customer network (e.g., via the NFISs).

The NFISs that enforce the client-specified security rules may be located in any of several kinds of premised in different embodiments. In some embodiments, an NFIS may be located at a regional data center of a cloud provider network. In other embodiments, the NFIS may be located at an edge premise or edge location of the cloud provider. In one embodiment, an NFIS may be located within a premise of the client on whose behalf the RBA is being implemented. CPSs may be located within the regional data centers of the cloud provider network in various embodiments.

As mentioned above, RBAs may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, or a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as an extension resource group of a VCS (virtualized computing service) of the provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network. Edge locations may also be referred to as edge premises.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets. In some embodiments, at least a portion of an MPN may be implemented using provider network resources deployed at edge locations and/or local zones.

The cloud provider network may implement various computing resources or services, which may include a VCS, an RBAMS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, NFISs used for RBAs may run one or more compute instances, which may be used to execute edge user data processing applications and/or some RBA network functions.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components may be run using containers at the NFISs in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. In some embodiments, CPSs of the kind discussed above may be implemented as part of the control plane of an RBAMS.

FIG. 1 illustrates an example system environment in which a service of a cloud provider network may enforce client-specified granular security rules for traffic of selected subsets of user equipment devices (UEs) of radio-based applications implemented using the service, according to at least some embodiments. As shown, system 100 includes resources and artifacts of several network-accessible service of a cloud provider network 101, including an RBAMS 110 and a VCS 192. The control plane 111 of the RBAMS 110 may include a set of control plane servers (CPSs) such as CPS 102A and CPS 102B, responsible for orchestrating the configuration (including security-related configuration aspects) and deployment of RBAs such as MPNs on behalf of RBAMS clients. The clients may utilize programmatic interfaces implemented by the RBAMS to provide requirement descriptors of desired RBAs to the CPSs (e.g., indicating the types of traffic expected at the RBAs, the kinds of network functions to be executed using RBAMS resources, approximate performance requirements of the RBA, the geographical distributions of the RBS UEs, etc.) in the depicted embodiment. The locations at which UEs may be present may include interior locations within buildings, such as factories, office buildings, shopping malls and the like, and/or exterior locations more exposed to the environment, such as a plaza, arena or gathering space of a city. In addition to the functional and performance requirements of their RBAs, in at least some embodiments clients may specify security rules (similar to, but not necessarily limited to, firewall rules) to be applied to respective subsets (or all) of the UEs of their RBAs in various embodiments. In some embodiments the security rules may be specified as part of the requirement descriptors, prior to the establishment of the RBAs; in other embodiments, at least some of the security rules may be specified separately from the other requirements. In at least one embodiment, one or more security rules may be specified by the owners of the UEs for which the rules are to be applied, e.g., as opposed to RBA administrators.

The network functions of various layers of the radio-based technology stacks of the RBAs may be implemented using network function implementation servers (NFISs) managed by the RBAMS control plane in the depicted embodiment. Some NFISs may be implemented at regional data centers of the provider network, such as NFIS 132A and NFIS 132B of region R1 NFIS fleet 130A, NFIS 132K and NFIS 132L of region R2 NFIS fleet 130B, and NFIS 132S and NFIS 132T of region R3 NFIS fleet 130C. Other NFISs may be at locations external to the regional data centers, such as NFIS(s) 155 at external RBA implementation location 154 such as a smart factory, and NFIS(s) 159 at external RBA implementation location 158 such as an exterior site in a city plaza or arena. Location 154 may comprise a set of user equipment devices (UEs) 156A, . . . , 156N, while location 158 may include UEs 161A, . . . , 161N.

The particular combination of NFISs utilized for a given client's RBA may be chosen based on the requirements specified by the client in the depicted embodiment. Based at least in part on analysis of an RBA requirement descriptor provided via programmatic interfaces, in some embodiments a recommended deployment configuration for the RBA may be generated and provided (e.g., by a CPS) to the client. A recommendation may indicate, for example, one or more NFISs that can be configured and deployed at one or more target locations (potentially including provider network data centers, as well as locations external to the provider network) if the recommendation is approved by the client. In some embodiments, the RBAMS may be able to recommend and provide an NFIS belonging to one of several NFIS categories, with the categories differing from one another in the hardware and software stacks available. For example, one category of NFIS may include hardware from a first vendor and a particular hypervisor, while another category may include hardware from a second vendor and include a different kind of hypervisor. If the client approves the recommendation deployment configuration, NFIS s with the approved configurations may be prepared and (if needed) transported to the selected locations. The NFISs in remote locations may establish secure connectivity with the CPSs in various embodiments.

A representation of the security rules specified by the clients may be propagated to the NFISs at which those rules are to be enforced in the depicted embodiment, e.g., via secure network connections. A given rule may be specified in such a way that software running at an NFIS which receives the rule from the CPS is able to detect, for any given user data packet received from or directed to a UE, whether that rule applies to that packet, and if so, what actions should be taken with respect to the packet. For example, based on some rules, one or more user data packets may be dropped or discarded at the NFIS instead of being transmitted to a UE, or transmitted from the UE towards a destination. If the transmission of a given user data packet is not prohibited by at least one security rule propagated to the NFIS, the NFIS may execute one or more network functions (e.g., core network functions, RAN node network functions etc.) and transmit the packet towards its intended destination. In some cases, actions other than dropping packets may be indicated in security rules, such as inspections of the packet contents, generation of notifications to specified recipients or destinations, and so on; the NFIS may perform these types of actions when packets matching criteria indicated in the rules are received in the depicted embodiment.

The subsets of UEs for which a given security rule is to be enforced may be indicated by the client in any of several ways in different embodiments—e.g., using client-defined tags assigned to the UEs, IP addresses of the UEs, hardware device identifiers, SIM card numbers, geographical locations and so on. A rule may specify the criteria to be used to select user data packets for applying the rule using any of a number of packet properties in different embodiments, such as network port numbers or port ranges, networking protocols, source/destination addresses or address ranges, and so on.

The RBAMS may include an edge application library in some embodiments, comprising a variety of applications for processing data payloads of RBA messages which can be executed on NFISs locally (e.g., outside the provider network data centers) if desired by RBAMS clients. The edge application library may include a set of provider network service-compatible applications and customized client-provided applications in one embodiment. The provider network service-compatible applications may provide similar functionality to cloud-based services (such as machine learning services, IoT device management services and the like) and implement the same APIs as cloud-based services, but may be run at the NFIS without requiring transfer of the processed data to/from the data centers of the provider network. Customized client-provided applications may implement data processing logic designed by clients, and may not necessarily support APIs of provider network services. In at least some embodiments, a set of applications from the edge application library may be installed at an NFIS.

After an NFIS is activated to execute network functions of an RBA of a client, in some embodiments a CPS may verify that connectivity has been established between the NFIS and one or more metrics collectors 183 of a remote resource monitoring service (RRMS) 182 of the cloud provider network. The monitoring service may collect status and metrics from the NFISs in various embodiments, including security-rule related metrics (such as the number of packets which were dropped due to a security rule for a particular RBA or a particular set of UEs) and provide the status and/or metrics to the clients via programmatic interfaces. In at least some embodiments, a CPS may perform various lower-level configuration tasks pertaining to an RBA set up using one or more NFISs, such as ensuring that the radio-based technology stack components at an NFIS are correctly configured to process signals of the frequency ranges indicated by the client, specific network functions selected by the client are being run, and so on.

In various embodiments, the software stack of an NFIS may include one or more compute instances (similar to compute instance 194 at virtualization host 193 of VCS 192) at which various applications or network functions may be executed. In one embodiment, an NFIS may include one or more software containers (configured with the help of a software container management service (SCMS) 185 of the cloud provider network 101), and such containers may be used for some applications or network functions.

NFISs may execute network functions of various layers of the radio-based technology stack (e.g., a 5G stack or a 4G/LTE (4$^{th}$ generation—Long Term Evolution) stack) selected for an RBA in various embodiments. For example, at some NFISs, network functions of an RU (radio unit) and a portion of the DU (distributed unit) of the RBA may be executed at a pluggable hardware card (referred to as a network function accelerator card), while other network functions of the DU, CU (centralized unit) and core network (e.g., including UPF) may be executed using general-purpose processors. In some NFISs, network functions of the RU, DU, CU and core network may all be executed at a pluggable hardware card. In at least some embodiments, user data processing applications, such as IoT data management applications, machine learning applications and the like may be run at an NFIS to analyze user data payloads of the RBA messages. In other embodiments, cloud-based RAN node and core NF (network function) executors at the provider network NFISs may be used to implement some of the network functions of the RBA—e.g., results of lower-layer network function executions may be sent to the cloud data centers for analysis by the higher layers. In some embodiments, the cloud-based RAN node and core NF executors may include one or more compute instances 194. In one embodiment, user data of the RBA may be transmitted to a compute instance of the VCS, and the user data may be processed/analyzed there.

Figure 2:
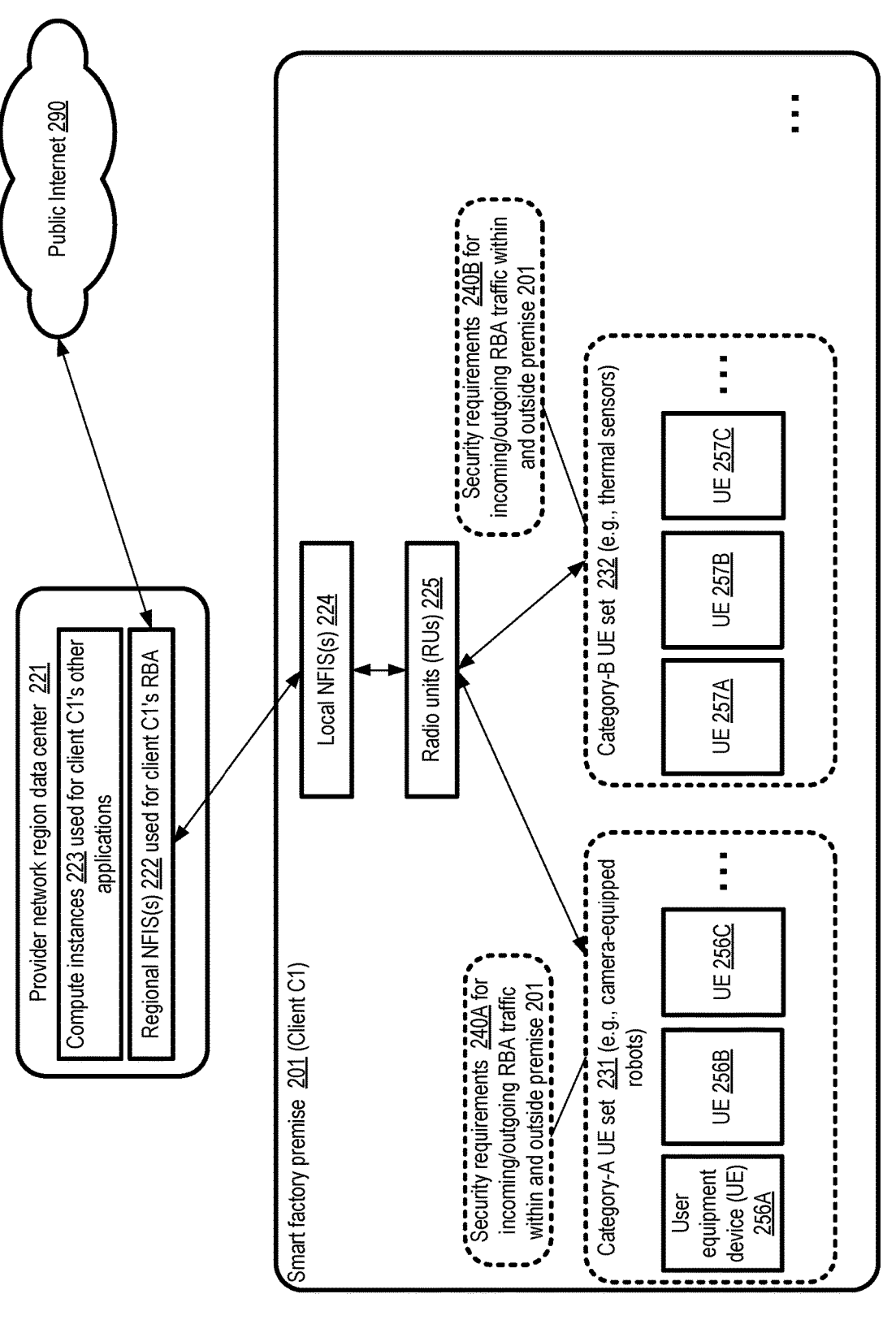
FIG. 2 illustrates an example smart factory at which respective sets of security requirements may apply to subsets of UEs of a radio-based application, according to at least some embodiments.

The customizable security enhancement techniques introduced above may be beneficial in numerous use cases. FIG. 2 illustrates an example smart factory at which respective sets of security requirements may apply to subsets of UEs of a radio-based application, according to at least some embodiments. In the scenario depicted in FIG. 2, a smart factory premise 201, belonging to or managed by a client C1 of a cloud provider network, may comprise a number of devices implementing respective portions of an RBA of C1. For example, the premise may include UEs 256A, 256B and 256C of a category-A UE set 231, such as camera-equipped robots capable of communicating via radio-frequency signals. The factory may also include a category-B UE set 232 comprising, for example, thermal sensor devices such as UE 257A, UE 257B or UE 257C, which may also be capable of communicating via radio signals. A provider network region data center 221 may include a set of compute instances 223 used for client C1's other applications, as well as regional NFISs 222 used to execute a subset of network functions of C1's RBA. The factory premise may include some local NFISs 224 and radio units (RUs) 225 of the RBA in the depicted embodiment.

The security requirements 240A for network traffic into or out of category-A UEs may differ from the security requirements 240B for category-B UEs. The potential network traffic of a given UE may be divided into at least four classes with respect to security: outbound traffic from the UE to other devices within the factory premise, outbound traffic from the UE to destinations external to the factory premise (such as destinations within the public Internet 290), inbound traffic to the UE from other devices within the factory premise, and inbound traffic to the UE from other devices external to the factory premise. For example, client C1 may wish to permit inbound HTTPs requests from a limited set of devices within an Internet-connected office of C1 to reach one or more category-A UEs which implement web servers, and responses to those HTTPs requests to be sent to those devices, but may wish to prohibit traffic between at least some category-B UEs and those category-A UEs. The traffic classes may also be subdivided further in some cases—e.g., the outbound traffic within the factory of a category-A UE may be subdivided into traffic to other UEs of category-A, traffic to UEs of category-B, and so on. Different security requirements may exist for each such class. In some cases, the security requirements of some UEs of a given category (such as category-A or category-B) may differ from other UEs of that category.

In various embodiments, to ensure that the security requirements of the various UEs within the factory are satisfied, client C1 may specify respective security rules of the kind introduced above for groups of UEs and/or single UEs via programmatic interfaces of the provider network's RBAMS. The client-specified rules may then be implemented at one or more NFISs used for the RBA—e.g., at NFISs implementing core network functions in the provider network region data center, and/or at NFISs implementing network functions locally within the factory premise itself. The programmatic interfaces may also allow the client to view representations of the security rules currently in effect for various subsets of UEs, change the security, view metrics associated with the rules, and so on, via a centralized portal or dashboard in at least some embodiments.

FIG. 3 illustrates example elements of a client-specified security rule for a subset of UEs of a radio-based application, according to at least some embodiments. As shown, a client-specified security rule 301 for a radio-based application may include UE subset ID (identification) information 304. A version of this information, indicating the particular group of one or more UEs to which the rule applies, may be transmitted by the RBAMS control plane to NFISs to enable the NFISs to determine, based on the identity of the UE with which a given user data packet is associated (i.e., the UE to/from which the packet is directed), whether the rule applies to a given packet received at the NFIS. The UE ID information (also referred to as rule applicability information with regard to UEs) may be specified in any of several ways by the RBA client (e.g., an administrator of the RBA, or the owner of a given UE or set of UEs). For example, in one embodiment, the RBAMS may enable a client to specify or define tags (arbitrary text strings selected by the client) for UEs—e.g., the string "Cat-A" may be specified as a tag for all the UEs belonging to a category Category-A, the string "Cat-B" may be specified as a tag for all the UEs belonging to a category Category-B, and so on. The RBAMS may maintain an internal tag database indicating the tags assigned to the different UEs by the client. The UE subset ID information provided by the client and stored as part of the security rule definition in at least some embodiments may be expressed using such tags—e.g., the UE subset ID information for rule 301 may indicate that the rule is to be enforced for all UEs tagged as "Cat-A" UEs. In some embodiments, IP addresses assigned to the UEs may be indicated as identifying information. In at least one embodiment, hardware device IDs of the UEs may be specified to enable the RBAMS to determine whether the rule is to be enforced. In some embodiments, a client may specify a geographic location constraint on the UEs to which the rule applies— e.g., in effect, the client may indicate that the rule is to be applied to all UEs within a particular room in a factory, or that it applies all UEs that are within a radius of N meters from a particular radio tower or cell tower, and so on. Note that in at least some embodiments, the ID information of a given UE may change over time—e.g., the UE may be moved from one location to another, its IP address may be changed, and so on. As a result, the set of client-specified security rules that apply to the traffic of that UE may also change. In such embodiments, the RBAMS control plane may ensure that the UE ID information propagated to the NFISs remains current and is sufficient for the NFISs to ensure that the rule is applied to the traffic of the UEs for which the rule was specified by the client.

The security rule 301 may indicate the protocol 305 whose packets are to be managed in accordance with the rule, and the network port range 306 (indicated in the packet headers) for which the rule applies in the depicted embodiment. A set of permitted sources 308 of inbound traffic may be included in the rule definition in some embodiments. In at least some embodiments, permitted destinations 310 of outbound traffic from the UEs may be indicated in the rule. In some embodiments, instead or in addition to specifying permitted sources/destinations, a rule may indicate prohibited sources/destinations. In some embodiments, by default all traffic may be prohibited to or from a UE, and security rules may have to be defined to enable inbound and outbound traffic. In some embodiments, the cloud provider network at which the RBAMS is implemented may support a security mechanism referred to as "security groups" which can be used by clients to control inbound and outbound network traffic of compute instances (or other resources) within specified subnets or specified isolated virtual networks referred to as virtual private clouds (VPCs) set up on behalf of the clients. In some embodiments, the RBAMS may in effect allow clients to define security groups for subsets of UEs; some of the fields that users can specify for security groups may include protocol, port ranges, permitted sources and destinations, for example.

In various embodiments, to implement a security rule 301 which prohibits certain types of packets, an NFIS may discard or drop such packets. In at least some embodiments, other types of actions referred to as auxiliary actions 312 may be taken in addition to or instead of dropping packets. Such actions may include generating notifications to specified destinations when a packet which meets criteria (e.g., port number, protocol etc.) indicated in the rule reaches the NFIS, causing contents of such packets to be inspected and/or analyzed using programs indicated in the rule, and so on.

According to some embodiments, a client may indicate enforcement layer preferences 314 for a security rule 301 indicating the layer of the radio-based technology stack at which the rule should be applied—e.g., whether the client prefers that the rule be enforced at an NFIS implementing core network functions, an NFIS implementing a centralized unit (CU) of a RAN node, and so on. If the client does not specify a preference for the enforcement layer, in some embodiments the RBAMS control plane may choose the layer using a set of heuristics—e.g., with the core network layer being preferred over other layers. A client-specified security rule may comprise elements not shown in FIG. 3 in some embodiments. In at least some embodiments, some of the rule elements shown in FIG. 3 may be stored separately from others—e.g., the information about identifying the UEs may be store separately from the information about ports, protocols, permitted sources and destinations, and so on.

Figure 4:
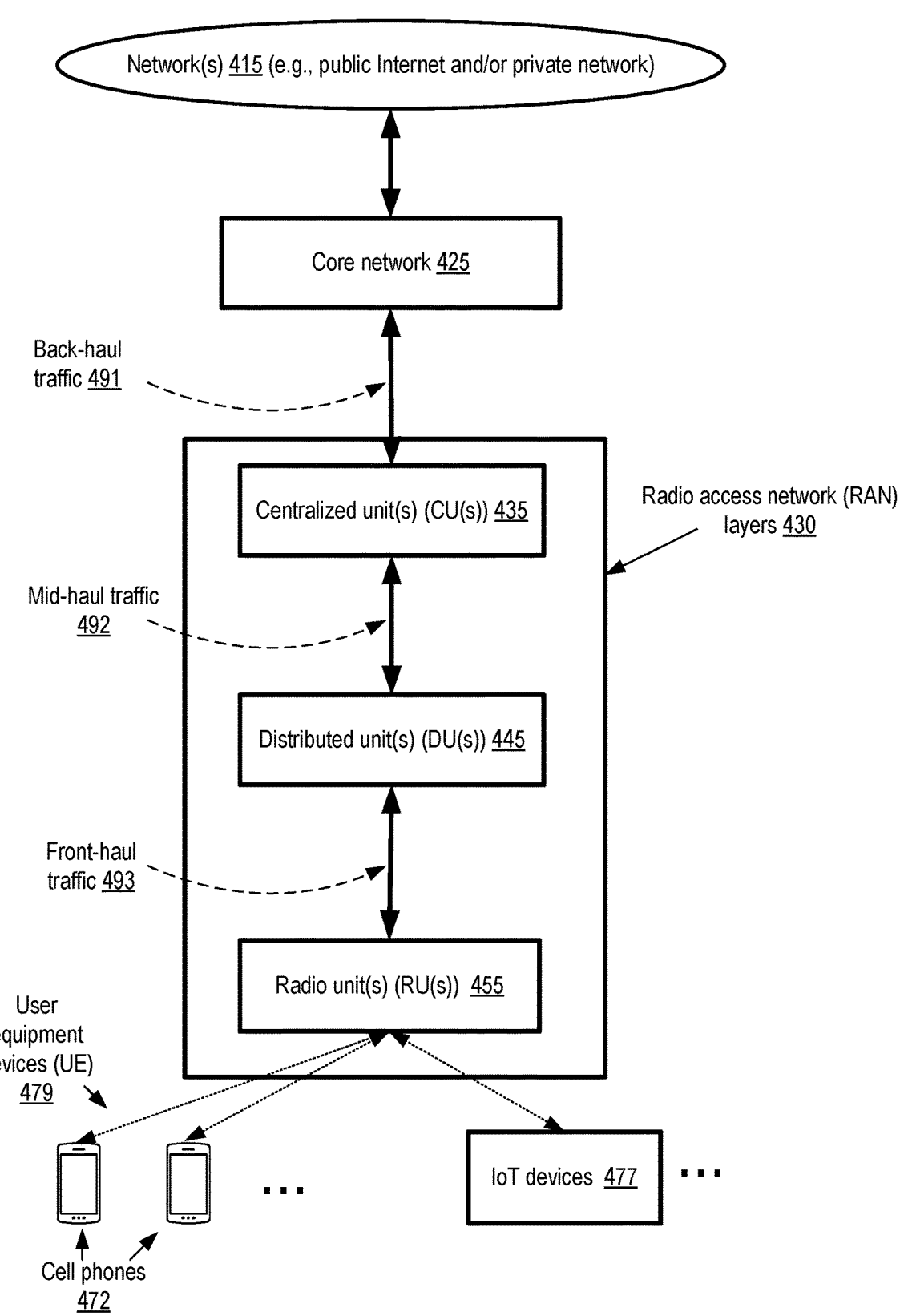
FIG. 4 illustrates an example hierarchy of layers of a radio-based technology stack which may be used for various radio-based applications, according to at least some embodiments.

FIG. 4 illustrates an example hierarchy of layers of a radio-based technology stack which may be used for various radio-based applications, according to at least some embodiments. In the depicted embodiment, a core network 425 layer of an RBA, linked to one or more networks 415 used to transfer the IP packets comprising the payloads and control signals of the RBA over large distances, may implement a set of back-end functions associated with radio-based applications, enabling different sub-networks of the overall system to communicate with one another. Network functions performed at the core network layer (referred to as core network functions) may for example include functions to aggregate data traffic from end user devices, authenticate subscribers, apply personalized policies, and/or manage the mobility of devices prior to routing traffic to operator services or the Internet.

The core network layer may be connected to one or more centralized units (CUs) 435 of a radio access layer (RAN) layer 430. The traffic between the core network layer and the CUs 435 may be referred to as back-haul traffic 491 in the depicted embodiment. A given CUs may in turn be connected to one or more distributed unite (DUs) 445 of the RAN layer, and a given DU may be connected to one or more radio units (RUs) 455 of the RAN layer. A combination of one or more CUs, one or more DUs and one or more RUs being used for a given RBA such as an MPN may be referred to collectively as a RAN node in some embodiments. A given RU may receive RBA messages from (and transmit RBA messages to) some number of user equipment (UE) devices 479, such as cell phones 472, IoT devices 477 and the like using radio antennas. The traffic between CUs and DUs may be referred to as mid-haul traffic 492, while the traffic between DUs and RUs may be referred to as front-haul traffic 493.

The mappings between the various RBA layers shown in FIG. 4, and the specific devices or servers at which the layers are implemented for a given RBA, may in general vary. In some embodiments, for example, respective servers or computing devices may be used to implement core network operations, CUs, DUs and RUs. In other embodiments, multiple layers (e.g., the RU, DU, CU and at least a portion of the core network) may be implemented at a single server. Within such a single server at which numerous layers of the radio-based technology stack are co-located, different combinations of the layers' functionality may be implemented using general-purpose processors such as CPUs than are implemented using hardware cards which comprise special-purpose chipsets in various embodiments. One of the advantages of co-locating the RU, DU, CU and core network functions on a single server is that very low latencies may be achieved for front-haul, mid-haul, and at least some back-haul messages.

Figure 5:
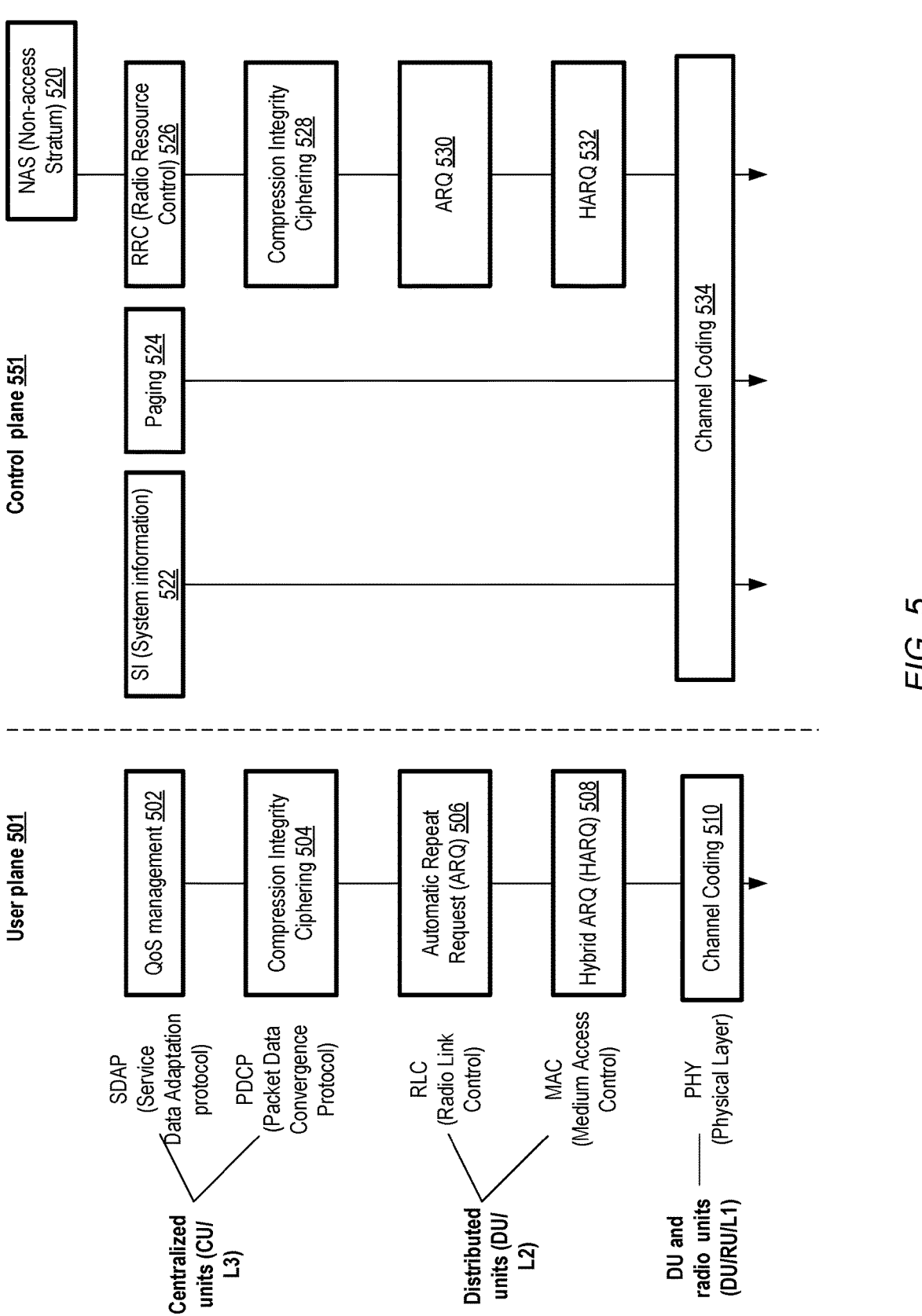
FIG. 5 illustrates an overview of radio access network (RAN) user plane and control plane layers defined in accordance with a radio-based application technology standard, according to at least some embodiments.

FIG. 5 illustrates an overview of radio access network (RAN) user plane and control plane layers defined in accordance with a radio-based application technology standard, according to at least some embodiments. The arrows shown in FIG. 5 represent the downlink communication path (from the higher levels of the standard, sometimes implemented at back-end servers or using general-purpose processors of an MIS, downwards to the lower levels which are implemented using front-end components such as pluggable hardware cards). The depicted layers conform to a 5G-NR (Fifth Generation—New Radio) standard published by 3GPP; similar layers are also defined for other generations of cellular communication technology.

In a manner somewhat analogous to the subdivision, discussed above, of a provider network functionality into control plane and data plane functionality, the operations needed for RBAs are divided into control plane operations and user plane operations. Control plane operations include connection configuration and other administrative tasks such as monitoring, while user plane operations involve transmission of user data using IP packets. Contents of control plane messages may indicate changes to RBA application state, and the state information thus obtained and updated may be used to process user plane messages.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: CUs for L3 operations, DUs for L2 operations and optionally for some L1 operations, and RUs used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 501 may include quality of service (QoS) Management 502 and Compression Integrity Ciphering 504 in L3, Automatic Repeat Request (ARQ) processing 506 and Hybrid ARQ (HARQ) processing 508 in L2, and Channel Coding 510 at the PHY layer. Operations of control plane 551 may include Non-access Stratum (NAS) 520 protocol tasks, System Information (SI) 522 tasks, Paging 524, Radio Resource Control (RRC) 526 and Compression Integrity Ciphering 528 in L3, ARQ 530 and HARQ 532 in L2, and Channel Coding 534 in the PHY layer. Various ones of the layers and protocols shown in FIG. 5 may comprise the execution of respective sets of network functions. In at least some embodiments, a subset of the network functions corresponding to L1, L2 and/or L3 may be implemented using pluggable hardware cards at NFISs. In at least one embodiment, a subset of the network functions corresponding to L1, L2 and/or L3 may be implemented at compute instances or software containers at NFISs. Client-specified security rules may be implemented at NFISs implementing network functions of L1, L2 or L3 layers in some embodiments.

Figure 6:
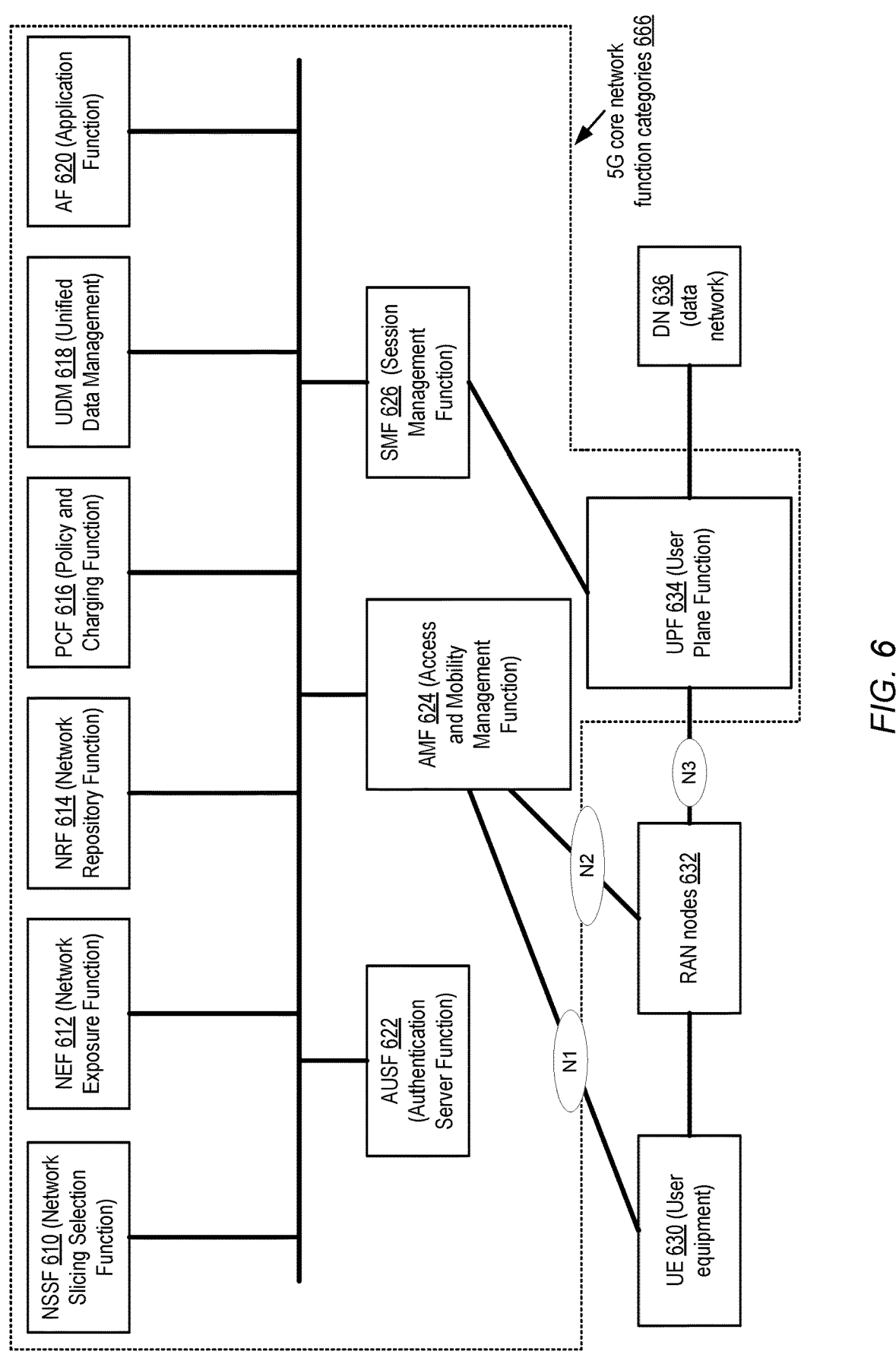
FIG. 6 illustrates example network functions which may be performed at a core network layer of a radio-based technology stack, according to at least some embodiments.

FIG. 6 illustrates example network functions which may be performed at a core network layer of a radio-based technology stack, according to at least some embodiments. The components shown in FIG. 6 correspond to a reference architecture for a version of a 3GPP 5G system released by ETSI (the European Telecommunications Standards Institute). Note that the techniques for supporting client-specified security rules introduced in this document may be used with other architectures and other combinations of network functions, and is not restricted to the particular architectures and layers shown in FIG. 4 FIG. 5 and FIG. 6.

5G core network function categories 666 in the depicted embodiment may include AMF 624 (Access and Mobility Management), UPF 634 (User Plane Function), NSSF 610 (Network Slicing Selection Function), NEF 612 (Network Exposure Function), NRF 614 (Network Repository Function), PCF 616 (Policy and Charging Function), UDM (Unified Data Management) 618, AF (Application Function) 620, AUSF 622 (Authentication Server Function) and SMF 626 (Session Management Function). The details of the kinds of operations expected to be performed by the network functions of the different network function categories, and the interfaces to be used for communications between the different categories of core network functions, are provided in 5G-related standards documents. With respect to the communications between RAN nodes 632 and the core network functions, two interfaces are defined in the standard: an interface referred to as N2 for control plane messages, and an interface referred to as N3 for user plane messages.

Control plane messages from a RAN node (e.g., from a CU of the RAN node) that are to be sent to the core network may be sent via the N2 interface to an AMF 624 in the depicted embodiment. Depending on the kind of control plane message, the AMF may then initiate various operations, which in some cases may involve intra-core-network messages between the AMF and other core network functions. The AMF may also send control plane message responses to the RAN node via the N2 interface. An AMF thus serves as a core network control plane access endpoint in at least some embodiments. In at least some implementations, control plane messages from user equipment (UE) 630 (such as cell phones, IoT devices, etc.), which can be transmitted to AMFs directly via an interface referred to as N1, may instead be sent to RAN nodes and from the RAN nodes to the AMFs using the N2 interface.

User plane messages from a RAN node 632 that are to be sent to the core network may be sent via the N3 interface to a UPF 634 in the depicted embodiment. At least in some cases, the contents of the user plane messages may originate at user equipment (UE) 630, and may have to be sent to some destination via a data network (DN) 636. The DN may for example comprise portions of a public network (such as the public Internet) and/or one or more private networks. The UPF may coordinate the transfer of the user plane message contents via the DN 636; responses to the user plane messages may be received by a UPF from the destinations and passed on to the UEs 630 via the RAN node. A UPF thus serves as a core network user plane access endpoint in at least some embodiments.

In embodiments in which the UPF for a given RBA such as an MPN is implemented at one or more servers of a regional data center of a provider network, user data received in the payloads of UE messages may be transmitted to the data center. In contrast, in embodiments in which the UPF is implemented at an NFIS deployed at a location outside the provider network (such as an edge location or client premises), bandwidth requirements for traffic between the external location and the provider network may be much lower, and latencies may also be much lower. In some embodiments, one or more categories of core network functions other than UPF may also be implemented at the NFISs deployed at locations external to the provider network data centers. Note that in some scenarios in which UPF logic is implemented at an NFIS at a location outside the provider network, while other core network functions are implemented at the provider network, substantial performance and bandwidth reduction benefits may be achieved because of the volume of data that has to be processed using UPF logic relative to the processing required from the other core network functions. As such, implementing UPF logic at an external location, while still implementing other core network functions at the cloud, may represent a reasonable implementation choice for at least some RBAs managed with the help of provider network services. In at least some embodiments, while the UPF for a given RBA may be executed at an NFIS (which has a pluggable card for implementing at least some RU and DU network functions) configured at a location external to the cloud provider network with the help of an RBAMS, one or more of the other network functions shown in FIG. 6 may be implemented at servers other than the NFIS—e.g., at servers located in the cloud provider network's data centers, or at servers located at the external location.

In some embodiments, a split implementation may be used for the UPF of an RBA—one subset of UPF tasks may be performed at an NFIS in a regional data center, while another subset of UPF tasks may be performed at an external location. In such split UPF implementations, client-specified security rules may be enforced at the NFISs used for either of the splits—the NFIS within the regional data centers, or the NFIS at the external locations. In one embodiment, some security rules may be enforced at the regional data center NFIS(s), while others may be enforced at the NFISs at external locations.

According to one embodiment, a client-specified security rule received at the RBAMS control plane may be converted or translated into one or more PFCP messages which are sent (e.g., by the AMF or SMF) to the NFIS where the UPF runs. In some embodiments, the RBAMS may implement an internal-use packet processing language, and the representations or versions of the security rules that are sent to the UPF may be expressed using such a language, e.g., by a CPS. For example, using such a language, a downlink PDR (packet detection rule) which by default allows all traffic to/from a specified UE may be modified using an SDF (service data flow) filter mentioned in the PFCP specification to only allow packets directed to a destination port 443 to be sent to the UE, with all other packets being dropped.

Figure 7:
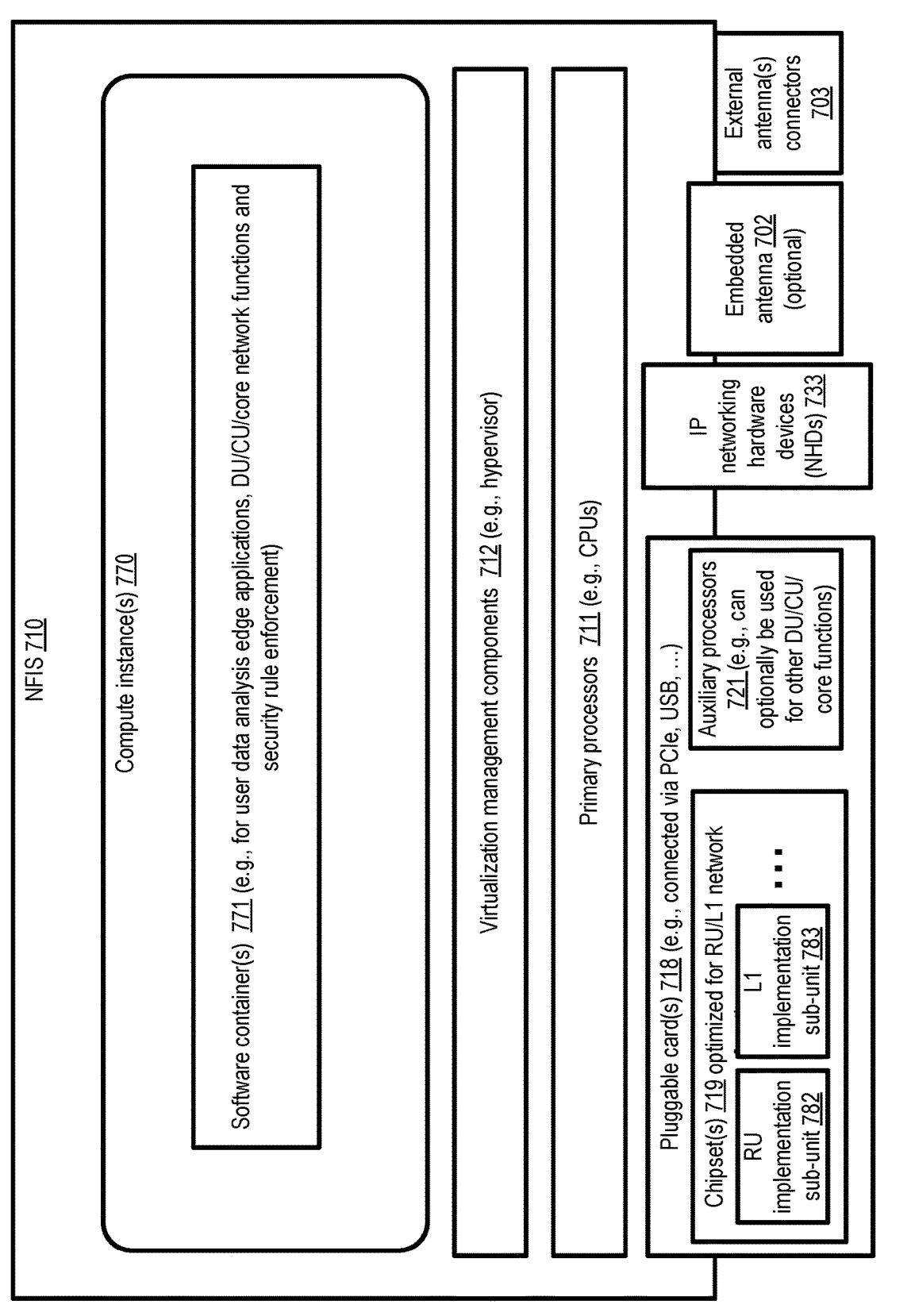
FIG. 7 illustrates an example network function implementation server which includes a pluggable card for executing network functions, according to at least some embodiments.

As mentioned earlier, in various embodiments client-specified security rules for subsets of UEs of an RBA may be implemented at an NFIS. In some embodiments, NFISs may comprise special purpose hardware devices or cards which can be used to accelerate the execution of certain types of RBS network functions, and/or to accelerate the enforcement of client-specified security rules. FIG. 7 illustrates an example network function implementation server which includes a pluggable card for executing network functions, according to at least some embodiments. NFIS 710 includes a set of primary processors 711 (e.g., CPUs), and at least one pluggable card 718 connected via a peripheral interconnect such as PCIe (Peripheral Component Interconnect—express), USB (Universal Serial Bus) or the like to the primary processors. The term "pluggable" is used to describe such cards because they can be easily attached or detached from the NFIS. For example, a pluggable card implementing one set of network functions can be replaced fairly quickly by a different pluggable card capable of implementing a different set of network functions, using a different optimization technique to accelerate the execution of the same network functions, and/or providing a different performance level for execution of the same network functions.

In the embodiment shown in FIG. 7, a given pluggable card 718 may include one or more chipsets 719 optimized for performing RU and L1 network functions of a RAN node. Respective sets of chips or circuitry may be used for an RU implementation sub-unit 782 and for an L1 implementation sub-unit 783 in some embodiments. In the depicted embodiment, a given pluggable card may include one or more auxiliary processors 721, which may if desired be used for other DU, CU, or core network functions and/or for edge applications. In some embodiments, an NFIS may include multiple pluggable cards, each utilized for a respective set of network functions or edge applications. In various embodiments, the NFIS may include one or more IP networking hardware devices (NHDs) 733 for IP message traffic (e.g., for communication with CPSs or other NFISs at data centers of the cloud provider network, and/or for communication with other devices at the location at which the NFIS is deployed). In some embodiments, client-specified security rules of the kind introduced above may be executed at a pluggable card.

In at least some embodiments, an NFIS may be used to run one or more compute instances 770 (e.g., virtual machines) of a VCS of the cloud provider network. A given compute instance 770 may use virtualized versions of primary processors 711 (referred to as virtual CPUs or vCPUs) to implement data analysis edge applications and/or a subset of DU/CU or core network functions of the RBA in some embodiments. Client-specified security rules may be enforced at the compute instances in some embodiments. The NFIS may include virtualization management components 712 (e.g., a hypervisor) which launch the virtual machines of the compute instances, and act as intermediaries between the hardware and the programs run within the virtual machines. In the depicted embodiment, a compute instance may be used to run one or more software containers 771, and the network functions, security-rule enforcement programs and/or edge applications may be run within the containers. In various embodiments, depending on the RBA requirements indicated by an RBAMS client, specific subsets of computing resources of an MIS (e.g., chipsets 719, auxiliary processors 721, or primary processors 711) may be chosen for implementing one or more network functions, edge applications, and/or security rule enforcement, and an NFIS configured accordingly may be recommended for the RBA by the RBAMS. Respective sets of executable instructions may be stored at the NFIS 710, and executed at the primary processors and the auxiliary processors to implement respective sets of network functions, edge application logic and/or security rule enforcement logic in various embodiments. In one embodiment, an NFIS may comprise an embedded antenna 702 for radio frequency signals. In other embodiments, an NFIS may include one or more connectors 703 for external antennas.

Figure 8:
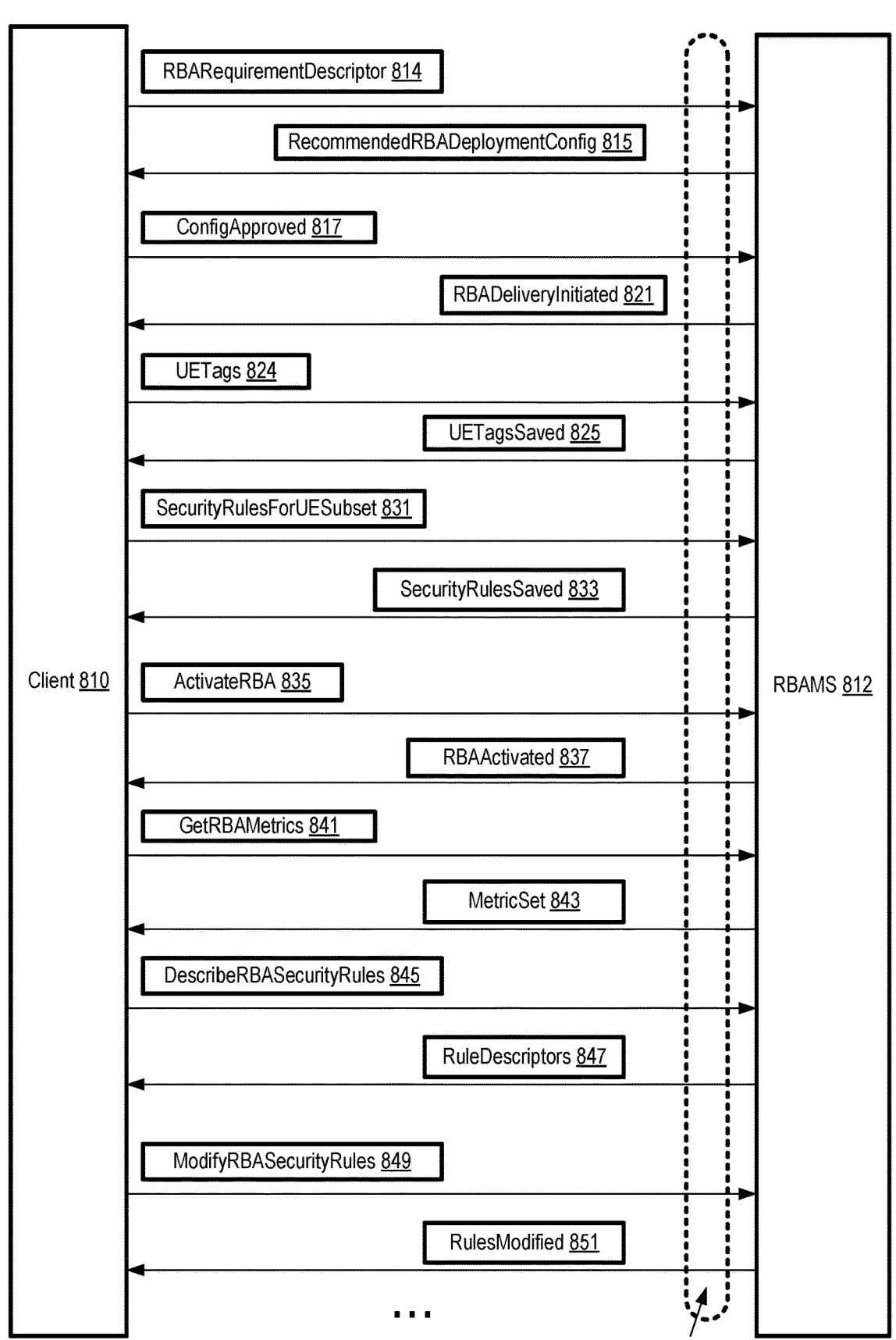
FIG. 8 illustrates example programmatic interactions, pertaining to radio-based application configuration and use, between clients and a provider network service, according to at least some embodiments.

FIG. 8 illustrates example programmatic interactions, pertaining to radio-based application configuration and use, between clients and a provider network service, according to at least some embodiments. In the depicted embodiment, an RBAMS 812 (similar in features and functionality to RBAMS 110 of FIG. 1) may implement a set of programmatic interfaces 877, such as web-based consoles, command-line tools, graphical user interfaces, APIs and the like, which can be utilized by clients 810 to submit messages or requests to the service and receive corresponding responses. A client 810 may, for example, submit a description of their requirements for a particular RBA such as an MPN via an RBARequirementDescriptor message 814. In various embodiments, the RBAMS 812 may try to reduce the amount of effort clients have to expend in order to get their RBAs set up and running; clients may therefore be granted substantial flexibility with regard to the level of detail provided in a requirement descriptor. Some clients may only provide a high-level summary of their requirements, such as the logical equivalent of "I need to set up a mobile private network for communicating with and controlling twenty industrial robots in my factory, which is A meters long and B meters wide." Other clients may provide more specifics about their RBA needs, such as details about performance requirements, the categories of UEs, redundancy/availability requirements for various kinds of network functions of the RBA, edge application requirements associated with the RBA, budgets, vendor preferences and the like. Control plane servers of the RBAMS may analyze the requirements, and generate a deployment recommendation, e.g., using a set of heuristics maintained at the RBAMS control plane. For example, a heuristic similar to the following may be used in one implementation to generate a recommended deployment configuration: "a given NFIS of category A can typically execute network functions of type NF1 for arriving messages at no more than rate R1 from a set of UE devices of type T1 spread over an area of A square meters". The recommendation may be provided to the client via a RecommendedRBADeploymentConfig message 815 in the depicted embodiment. In some embodiments, a given recommended RBA deployment configuration generated and provided by the RBAMS may include several NFISs, e.g., intended to be located at various spots within a large factory or building. In one embodiment, a pluggable card of a recommended NFIS may include a hardware accelerator optimized for one or more types of network functions, thereby enabling lower latencies for RBA message processing than if those network functions were to be executed at general-purpose processors. In some embodiments, a recommended NFIS may comprise multiple pluggable hardware cards, with individual ones of the cards being employed for respective types of network functions and/or edge applications.

The client 810 may indicate that the recommended configuration has been approved, e.g., by sending one or more ConfigApproved messages 817 in the embodiment shown in FIG. 8. In some cases, the approved configuration may require delivery of one or more NFIMSs to premises external to the provider network data centers, and the ConfigApproved message may include an order to initiate delivery of the set of MISs indicated in the recommendation. The NFISs may be shipped to the targeted location(s) for the RBA, and an RBADeliveryInitiated message 821 may be sent to the client via the programmatic interfaces 877 in some embodiments. In some cases, the NFISs approved for the RBA may be part of a pre-configured fleet of NFISs of the RBAMS, with minimal or no additional configuration needed. In other cases, some amount of custom configuration may be performed at the RBAMS (e.g., one or more edge applications may be added or removed from a default pre-configured NFIS, one or more pluggable cards may be added or removed from a default configuration, and so on). There may be some delay between the approval of the configuration and the initiation of delivery of the NFISs (and the corresponding transmission of the RBADeliveryInitiated message) in some cases, with the delay dependent on the amount of customization required. In some embodiments, the RBAMS may configure all NFISs from scratch after receiving approvals of recommended configurations, without maintaining a pre-configured set of NFISs. In one embodiment, the RBAMS may provide an indication of the available default configurations of one or more categories of NFISs via programmatic interfaces 877, and a client may simply order some number of such NFISs of selected categories, without specifying requirements or obtaining a recommendation.

In at least some embodiments, the RBAMS may implement programmatic interfaces which can be used to specify tags (strings that simplify identification) for various UEs of an RBA. A client such as an administrator of the RBA may choose tags for respective subsets of the UEs—e.g., a tag "FactoryRobotsClassA" may be assigned to a first category of robots in a factory at which at least a portion of the RBA is implemented, a tag "FactoryRobotsClassB" may be assigned to a second category of robots in the factory, and so on. The client may submit one or more UETags messages 824 to specify the tags in the depicted embodiment. The tags (and the mappings between the tags and the corresponding UEs) may be stored in a metadata repository of the RBAMS, and a UETagsSaved message 825 may be sent to the client in some embodiments.

The client may specify respective security rules for groups of the RBA UEs via one or more SecurityRulesForUESubsets messages 831 in some embodiments. A given message 831 may, for example, contain some or all elements of the kind shown in FIG. 3, including criteria for applicability (which particular UEs the rules applies to, which packets to/from those UEs the rule applies to, etc.) as well as the actions to be taken when applying the rules (e.g., dropping packets, generating notifications, etc.). Note that in some embodiments, an administrator of the RBA may submit the security rules, while in other embodiments, individuals that own or utilize one or more UEs may submit the rules. The security rules may be stored at the RBA and a SecurityRulesSaved message 833 may be sent to the client.

In some embodiments, a client may submit an ActivateRBA message 835 to start the flow of user data packets of the RBA to/from the UEs. An RBAActivated message 837 may be sent to the client to indicate that RBA components (e.g., network function execution programs at various NFISs) have been activated, and that UE data can begin to flow via the components.

The client may request various kinds of status information and metrics collected (e.g., by a remote resource monitoring service such as RRMS 182 of FIG. 1) from the RBA by submitting a GetRBAMetrics request 841 in some embodiments. A variety of metrics of the RBA, such as resource usage levels (CPU utilization, memory utilization, storage utilization, pluggable card chipset or auxiliary processor utilization, IP network bandwidth utilization) at various components including NFISs, RBA message rates, RBA message latencies, error rates, the number of packets which were dropped due to a security rule for a particular RBA or a particular set of UEs, and the like may be provided to the client via MetricSet messages 843. In some embodiments, a common console or graphical interface may be used by the client to view status and metrics of the RBA NFISs as well as status and metrics of other resources of the client at one or more provider network services (such as compute instances at the VCS, storage servers or databases at provider network storage services, and the like). In some embodiments, clients may be billed by an RBAMS for the use of NFISs on the basis of the amount of message traffic processed at the NFISs, and the MetricSet messages may provide an indication of the billing costs incurred over various time intervals.

A client may submit a DescribeRBASecurityRules request 845 to obtain an indication of the set of security rules currently in place for a given RBA in the depicted embodiment. Various details of the rules that have been specified by the client and are being enforced may be provided via one or more RuleDescriptors messages 847. In various embodiments, a client may change some aspects of one or more previously-specified security rules, e.g., by submitting a ModifyRBASecurityRules request 849. The client may, for example, change the set of UEs to which a rule applies, add new traffic sources/destinations/ports to the list of sources/destinations/ports previously specified, change the action to be taken, and so on. The rules may be changed as requested, and a RulesModified 851 message may be sent to the client in some embodiments to indicate that the changes have been made effective. In some embodiments, the RBAMS may support other types of programmatic interactions pertaining to RBA configuration and security rules than those shown in FIG. 8.

FIG. 9 is a flow diagram illustrating aspects of operations which may be performed to enforce client-specified security rules for UEs of radio-based applications implemented with the help of a provider network service, according to at least some embodiments. As shown in element 901 of FIG. 1, a set of security rules to be enforced on user plane traffic of a subset of UEs of an RBA of a customer or client C1 of an RBAMS of a cloud provider network may be received, e.g., via programmatic interfaces at a CPS.

The particular subcomponent of the RBA stack at whose NFISs the rules are to be enforced for C1's RBA may be selected or determines by the CPS in various embodiments (element 904). In some cases, the rule definitions provided by the client may indicate preferences for the subcomponents to be used for enforcing the rules, and such preferences may be used to select the subcomponents if possible; in other cases, such preferences may not be provided by the client, and the CPS may choose the subcomponents. In some embodiments, the CPS heuristics or rules may tend to favor rule enforcement at more centralized or higher-level components such as NFISs implementing core network functions, because this would require the rules to be propagated to fewer components (thereby reducing the risk of some components not getting the rules) and also reduce bandwidth usage in at least some scenarios (as packets that are to be discarded based on the rules would not have to be sent to components closer to their destination UEs before being discarded).

In various embodiments, a version or representation of the security rules in a format appropriate for the selected components (such as PFCP messages in the cases where the UPFs are selected as the components which are to enforce the rules) may be generated (element 907). The representations of the rules may then be transmitted or propagated from the CPS control plane to the selected subcomponent at the set of NFISs at which those subcomponents are run for C1's RBA.

At a given NFIS which received the rules, the rules may be stored in local storage in some embodiments (element 910). When the NFIS receives a user data packet of C1's RBA (element 913), the NFIS may determine the action (if any) to be taken in view of the rules. For example, if a security rule applies to a received packet, and the rule indicates that the packet should be prevented from reaching the UE to which it is directed, the NFIS may drop the packet without executing other network functions which would normally be executed if the packet were permitted. In contrast, if no security rule applies, or if a security rule applies but permits transmission of the packet towards a destination UE, the other network functions may be executed at the NFIS and the packet may be transmitted along a path towards the destination UE, causing the packet to be received at the destination UE. The path may include one or more other NFISs in some embodiments. Operations corresponding to elements 913 and 916 may be performed for various user data packets received at the NFIS in the depicted embodiment. It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
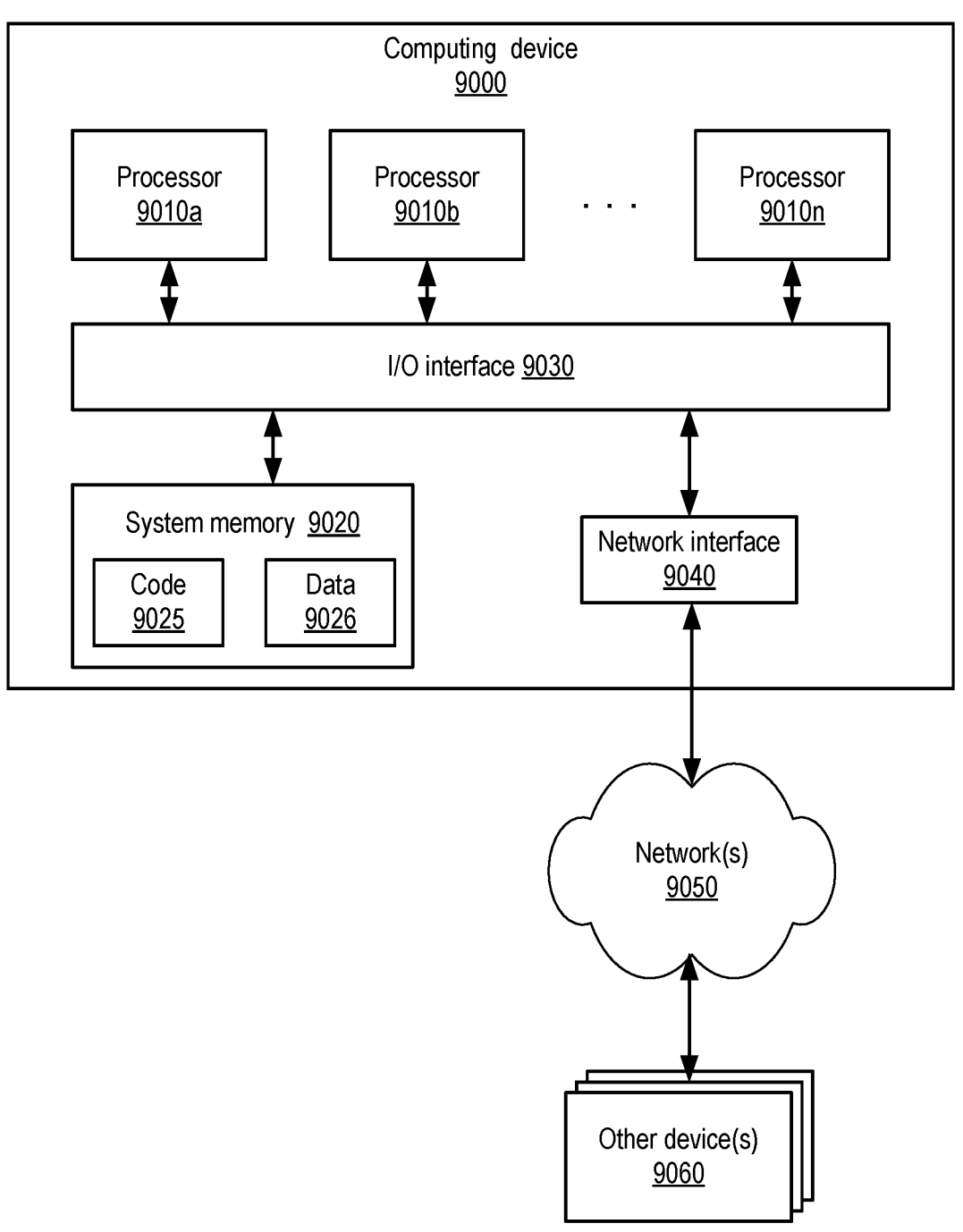
FIG. 10 is a block diagram illustrating an example computing device that may be used in at least some embodiments.

In at least some embodiments, a server that implements the types of techniques described herein (e.g., various functions of a provider network service such as an RBAMS, including NFIS functions), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more processors and corresponding memory to implement a control plane server of a radio-based application management service of a cloud computing environment; and one or more processors and corresponding memory to implement a network function implementation server of the radio-based application management service;

wherein the one or more processors and corresponding memory of the control plane server is configured to:

receive, via a programmatic interface from a client of the radio-based application management service, a set of firewall rules to be enforced, by the network function implementation server, on user plane traffic of a subset of user equipment (UE) devices of a plurality of UE devices of a radio-based application, wherein the set of firewall rules comprises a particular firewall rule prohibiting transmission of a given packet to a UE device; and cause a representation of a particular firewall rule of the set of firewall rules to be propagated to the network function implementation server; and wherein the one or more processors and corresponding memory of the network function implementation server is configured to:

in response to (a) receiving a first packet of the radio-based application, comprising user data directed to a first UE device of the subset and (b) determining that the particular firewall rule does not prohibit transmission of the first packet to the first UE device, execute a particular network function of a core network layer of the radio-based application with respect to the first packet, and cause the first packet to be transmitted to the first UE device; and in response to (a) receiving a second packet of the radio-based application, comprising user data directed to a second UE device and (b) determining that the particular firewall rule prohibits transmission of the second packet to the second UE device, drop the second packet without executing the particular network function with respect to the second packet.

2. The system as recited in claim 1, wherein the control plane server is further configured to:

obtain, from the client, a text string which is to be utilized as a tag for the subset of UE devices, wherein the set of firewall rules specify the text string to indicate applicability of the set of firewall rules to the subset of UE devices.

3. The system as recited in claim 1, wherein the control plane server is further configured to:

obtain, from the client, an indication that the subset of UE devices to which the set of firewall rules applies is to be identified based at least in part on one or more of: (a) Internet Protocol (IP) addresses of individual ones of the UE devices or (b) hardware device identifiers of individual ones of the UE devices.

4. The system as recited in claim 1, wherein the control plane server is further configured to:

obtain, from the client, an indication that the subset of UE devices to which the set of firewall rules applies is to be identified based at least in part on physical location of individual ones of the UE devices.

5. The system as recited in claim 1, wherein the network function implementation server is located at an edge premise of the cloud computing environment, and wherein the control plane server is located at a regional data center of the cloud computing environment.

6. A computer-implemented method, comprising:

obtaining, via one or more programmatic interfaces at a radio-based application management service of a cloud provider network, a set of security rules to be enforced on user plane traffic of a subset of user equipment (UE) devices of a plurality of UE devices of a radio-based application, wherein one or more of the set of security rules indicate one or more actions to be taken with respect to one or more packets of the user plane traffic;

receiving a packet of the radio-based application, comprising user data associated with a UE device of the subset, at a network function implementation server of the radio-based application management service, wherein the network function implementation server is configured to execute one or more network functions of the radio-based application with respect to packets of the radio-based application; and in accordance with a particular security rule, of the set of security rules obtained via the one or more programmatic interfaces at the radio-based application management service, indicating an action of the one or more actions to be taken with respect to one or more packets of the user plane traffic, causing, by the network function implementation server, the action to be implemented with respect to the packet, without executing the one or more network functions with respect to the packet.

7. The computer-implemented method as recited in claim 6, wherein the action indicated in the particular security rule comprises one or more of: (a) dropping the packet, (b) analyzing contents of the packet or (c) generating a notification.

8. The computer-implemented method as recited in claim 6, wherein one or more network functions include one or more of: (a) a core network function or (b) a network function of a centralized unit (CU) of a radio access network (RAN) node.

9. The computer-implemented method as recited in claim 6, further comprising:

obtaining, via the one or more programmatic interfaces at the radio-based application management service, a text string which is to be utilized as a tag for the subset of UE devices, wherein the set of security rules specify the text string to indicate applicability of the set of security rules to the subset of UE devices.

10. The computer-implemented method as recited in claim 6, wherein to indicate applicability of the set of security rules to the subset of UE devices, the set of security rules specify one or more of: (a) Internet Protocol (IP) addresses of at least some UE devices of the subset or (b) hardware device identifiers of at least some UE devices of the subset.

11. The computer-implemented method as recited in claim 6, wherein to indicate applicability of the set of security rules to the subset of UE devices, the set of security rules indicate a physical or geographical location of the subset of UE devices, without specifying respective identifiers of individual ones of the UE devices of the subset.

12. The computer-implemented method as recited in claim 6, wherein the set of security rules specify a network port to be used to determine whether the particular security rule applies to a particular packet.

13. The computer-implemented method as recited in claim 6, wherein the set of security rules specify a network protocol to be used to determine whether the particular security rule applies to a particular packet.

14. The computer-implemented method as recited in claim 6, wherein the network function implementation server is located at an edge premise of the cloud computing environment.

15. The computer-implemented method as recited in claim 6, further comprising:

in response to obtaining the set of security rules, generating one or more PFCP (packet forwarding control protocol) messages indicating the particular security rule; and propagating the one or more PFCP messages to the network function implementation server.

16. A non-transitory computer-accessible storage medium storing program instructions that when executed on a processor:

obtain, via one or more programmatic interfaces at a radio-based application management service of a cloud provider network, a set of security rules to be enforced on user plane traffic of a subset of user equipment (UE) devices of a plurality of UE devices of a radio-based application, wherein one or more of the set of security rules indicate one or more actions to be taken with respect to one or more packets of the user plane traffic;

receive a packet of the radio-based application, comprising user data associated with a UE device of the subset, at a network function implementation server of the radio-based application management service, wherein the network function implementation server is configured to execute one or more network functions of the radio-based application with respect to packets of the radio-based application; and in accordance with a particular security rule, of the set of security rules obtained via the one or more programmatic interfaces at the radio-based application management service, indicating an action of the one or more actions to be taken with respect to one or more packets of the user plane traffic, cause, by the network function implementation server, the action to be implemented with respect to the packet.

17. The non-transitory computer-accessible storage medium as recited in claim 16, wherein the action indicated in the particular security rule comprises one or more of: (a) dropping the packet, (b) analyzing contents of the packet or (c) generating a notification.

18. The non-transitory computer-accessible storage medium as recited in claim 16, wherein the network function implementation server is configured to execute one or more network functions of the radio-based application including one or more of: (a) a core network function or (b) a network function of a centralized unit (CU) of a radio access network (RAN) node.

19. The non-transitory computer-accessible storage medium as recited in claim 16, wherein the UE device comprises one of: (a) a phone, (b) a robot, (c) a sensor device, (d) an Internet-of-Things (IoT) device, (e) a portable computer system, (f) an augmented reality/virtual reality (AR/VR) device or (g) a voice-activated personal assistant device.

20. The non-transitory computer-accessible storage medium as recited in claim 16, wherein the UE device comprises an access point configured to (a) distribute packets, received via one or more network function implementation servers of the radio-based application, among a plurality of other devices of a particular customer network and (b) transmit packets, originating at the plurality of other devices, to one or more destinations outside the particular customer network via the one or more network function implementation servers.

\* \* \* \* \*